(12) United States Patent
Rainville et al.

(10) Patent No.: US 11,742,500 B2
(45) Date of Patent: Aug. 29, 2023

(54) STRUCTURAL GASEOUS MATERIAL STORAGE TANK

(71) Applicant: Bell Helicopter Textron Inc., Fort Worth, TX (US)

(72) Inventors: Joseph Dean Rainville, Fort Worth, TX (US); William Ben Johns, Little Elm, TX (US)

(73) Assignee: Textron Innovations Inc., Providence, RI (US)

( * ) Notice: Subject to any disclaimer, the term of this patent is extended or adjusted under 35 U.S.C. 154(b) by 1104 days.

(21) Appl. No.: 16/372,341

(22) Filed: Apr. 1, 2019

(65) Prior Publication Data
US 2020/0313209 A1 Oct. 1, 2020

(51) Int. Cl.
*H01M 8/04* (2016.01)
*F17C 1/14* (2006.01)
*B64C 39/02* (2023.01)
*H01M 8/04082* (2016.01)
(Continued)

(52) U.S. Cl.
CPC ....... *H01M 8/04201* (2013.01); *B64C 39/024* (2013.01); *F17C 1/14* (2013.01); *H01M 8/04089* (2013.01); *B64U 50/19* (2023.01); *F17C 2201/0104* (2013.01); *F17C 2205/0103* (2013.01); *F17C 2205/0157* (2013.01); *F17C 2205/0323* (2013.01); *F17C 2221/012* (2013.01); *F17C 2223/0123* (2013.01); *F17C 2223/035* (2013.01); *F17C 2223/036* (2013.01); *H01M 2250/20* (2013.01)

(58) Field of Classification Search
CPC ......... H01M 8/04201; H01M 8/04082; H01M 8/04089; B60K 15/03006; B60K 15/03; B64C 39/024; B64C 39/02; B64C 1/068; B64C 1/0683; B64C 1/0685; F17C 1/14
USPC .... 220/4.15, 4.14, 4.12, 4.16, 581; 244/120, 244/119
See application file for complete search history.

(56) References Cited

U.S. PATENT DOCUMENTS 2,596,839 A * 5/1952 Clausen ................. B64D 37/12
220/4.15
2,653,541 A * 9/1953 Kanode ................... F42B 12/44
220/4.15
(Continued)

FOREIGN PATENT DOCUMENTS

EP 1179702 A1 * 2/2002 ............... C01B 3/00

*Primary Examiner* — Robert J Hicks
(74) *Attorney, Agent, or Firm* — Lightfoot & Alford PLLC

(57) ABSTRACT

A tank has a body defining a chamber therein, the chamber is configured to store a gas at a pressure greater than atmospheric pressure, a first mounting element extending from the body, and a second mounting element extending from the body. The first mounting element and the second mounting element are configured for coupling to a first component of a vehicle and a second component of the vehicle, respectively, and the body is configured to carry a structural load between the first component and the second component when the first mounting element and the second mounting element are coupled thereto. The first component carries a propulsion device and the second component comprises at least one of a wing and a landing element. The tank further includes a stem having an orifice and the stem is configured for delivering the gas to the propulsion device through the orifice.

15 Claims, 12 Drawing Sheets

(51) Int. Cl.
  *H01M 8/04089* (2016.01)
  *B64U 50/19* (2023.01)

(56) References Cited

U.S. PATENT DOCUMENTS

| | | | | |
|---|---|---|---|---|
| 2,793,779 | A | * | 5/1957 | Woods .................. B64D 37/04 |
| | | | | 220/4.15 |
| 2,867,396 | A | * | 1/1959 | Johnson ................ B64D 37/12 |
| | | | | 294/82.26 |
| 2011/0139796 | A1 | * | 6/2011 | Lukiyanets ............... F17C 1/06 |
| | | | | 220/581 |
| 2018/0002026 | A1 | * | 1/2018 | Oldroyd ................. B64C 11/46 |
| 2018/0257761 | A1 | | 9/2018 | Oldroyd et al. |
| 2018/0290742 | A1 | | 10/2018 | Oldroyd et al. |
| 2019/0031361 | A1 | | 1/2019 | McCullough et al. |

* cited by examiner

STRUCTURAL GASEOUS MATERIAL STORAGE TANK

BACKGROUND

Unmanned aerial vehicles ("UAVs"), or drones, are usually battery powered and are therefore limited in range by battery life. Hydrogen fuel cells are being considered as an option to extend range and flight time of UAVs. Fuel cells operate by allowing an electrochemical reaction between hydrogen and oxygen, which produces electrical energy and water. In most fuel cell powered vehicles, hydrogen fuel, stored in an onboard hydrogen fuel tank, is supplied to an anode of the fuel cell and ambient air is supplied to a cathode of the fuel cell. The electrical energy produced drives a motor and the water is disposed of The hydrogen fuel tanks are often externally coupled to the UAV or may be housed internally within a nacelle, such as described in U.S. patent application Ser. No. 16/290,704, filed Mar. 1, 2019, which is incorporated herein in by reference in its entirety. Hydrogen tanks and fuel cells, along with the electronics they power, are complex devices that may be difficult to repair at an operating location.

UAVs come in many different configurations. For example, a UAV may be configured as a conventional takeoff and landing (CTOL) aircraft or a vertical takeoff and landing (VTOL) aircraft. A CTOL aircraft generates lift in response to the forward airspeed of the aircraft. The forward airspeed is typically generated by thrust from one or more propellers. Accordingly, CTOL aircraft typically require a long runway for takeoff and landing to accommodate the acceleration and deceleration required to provide the desired lift. Unlike CTOL aircraft, VTOL aircraft do not require runways. Instead, VTOL aircraft are capable of taking off, hovering and landing vertically. One example of VTOL aircraft is a helicopter which includes one or more rotors that provide lift and thrust to the aircraft. The rotors not only enable hovering and vertical takeoff and landing, but also enable forward, backward, and lateral flight. These attributes make helicopters highly versatile for use in congested, isolated, or remote areas where CTOL aircraft may be unable to take off and land. Helicopters, however, typically lack the forward airspeed and range of CTOL aircraft. Other examples of VTOL aircraft include tiltrotor aircraft and tiltwing aircraft. Both of which attempt to combine the benefits of a VTOL aircraft with the forward airspeed and range of a CTOL aircraft. Tiltrotor aircraft typically utilize a pair of nacelles rotatably coupled to a fixed wing. Each nacelle includes a proprotor extending therefrom, wherein the proprotor acts as a helicopter rotor when the nacelle is in a vertical position and a fixed-wing propeller when the nacelle is in a horizontal position. A tiltwing aircraft utilizes a rotatable wing that is generally horizontal for forward flight and rotates to a generally vertical orientation for vertical takeoff and landing. Propellers are coupled to the rotating wing to provide the required vertical thrust for takeoff and landing and the required forward thrust to generate lift from the wing during forward flight.

Yet another example of a VTOL aircraft is a tailsitter aircraft. Tailsitter aircraft, such as those disclosed in U.S. patent application Ser. No. 16/154,326, filed Oct. 8, 2018 and U.S. patent application Ser. No. 15/606,242, filed May 26, 2017, both of which are incorporated herein by reference in their entireties, attempt to combine the benefits of a VTOL aircraft with the forward airspeed and range of a CTOL aircraft by rotating the entire aircraft from a vertical orientation for takeoff, landing, hovering, and low-speed horizontal movement, to a horizontal orientation for high speed and long-range flight.

DETAILED DESCRIPTION

Figure 1:
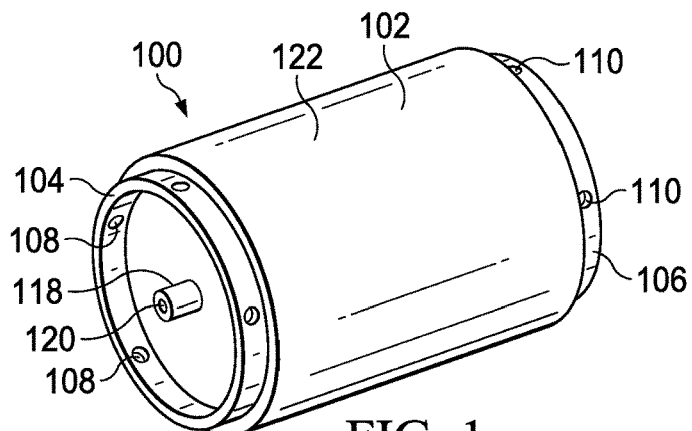
FIG. 1 is an oblique view of a structural gas tank, according to this disclosure.
Figure 2:
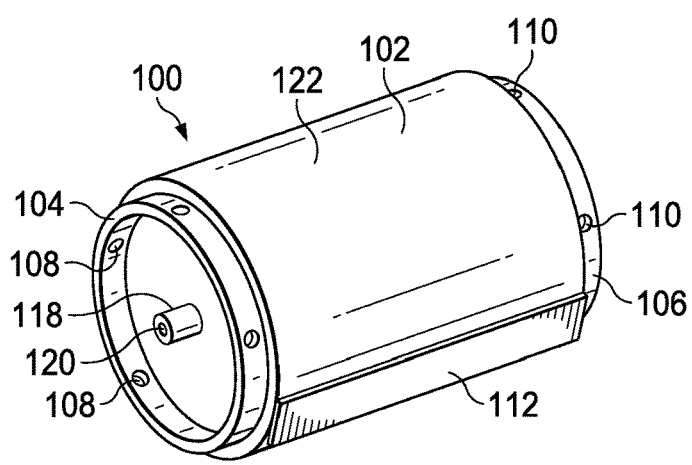
FIG. 2 is an oblique view of the structural gas tank of FIG. 1 including additional mounting elements.
Figure 3:
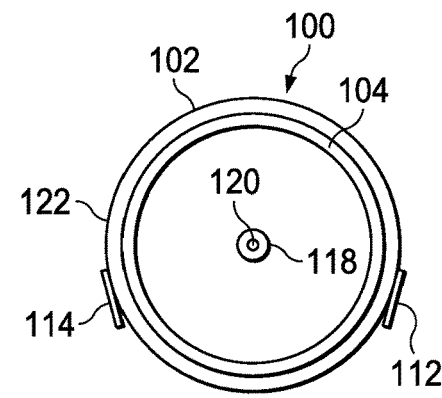
FIG. 3 is a front view of the structural gas tank of FIG. 2.

While the making and using of various embodiments of this disclosure are discussed in detail below, it should be appreciated that this disclosure provides many applicable inventive concepts, which can be embodied in a wide variety of specific contexts. The specific embodiments discussed herein are merely illustrative and do not limit the scope of this disclosure. In the interest of clarity, not all features of an actual implementation may be described in this disclosure. It will of course be appreciated that in the development of any such actual embodiment, numerous implementation-specific decisions must be made to achieve the developer's specific goals, such as compliance with system-related and business-related constraints, which will vary from one implementation to another.

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. In addition, the use of the term "coupled" throughout this disclosure may mean directly or indirectly connected, moreover, "coupled" may also mean permanently or removably connected, unless otherwise stated.

This disclosure divulges a structural gas tank that may be used for storing any gaseous material, or material that produces a gas, including, for example, high pressure hydrogen gas, solid-state storage such as hydrides, or oxygen gas. Throughout this disclosure and the claims appended hereto, references to storing a gas should be understood to include storing a material in a gaseous state and/or solid-state storage of a gas bonded to a solid, unless otherwise stated. This disclosure further divulges an aircraft that may include a structural gas tank as part of the airframe and/or include fuel cell powered line-replaceable thrust modules having structural gas tanks. The structural gas tank includes a body defining a chamber configured to store a pressurized gas therein. The structural tank may include a first mounting element and a second mounting element configured to be coupled to separate components of a vehicle and carry a structural load therebetween. The structural tank may also include an outer surface configured to create a flush junction with an exterior surface of a component the tank is coupled to. The aircraft may include a flight control system and an airframe with an anchoring location, referred to as a nacelle station, having a rapid connection interface. The aircraft may also include a hydrogen tank functioning as structural portion of the airframe, wherein the hydrogen tank is plumbed to provide hydrogen to a local and/or remote fuel cell. The fuel cell powered line-replaceable thrust module may include a nacelle having a rapid connection interface, a fuel cell system disposed within the nacelle, a speed controller coupled to the fuel cell system, a propulsion system coupled to the speed controller and the fuel cell system, a tail section, and a hydrogen tank coupled between the nacelle and the tail section. The propulsion system includes an electric motor having an output drive and a rotor assembly having a plurality of rotor blades that are rotatable with the output drive of the electric motor in a rotational plane to generate thrust. The electric motor is operable to rotate responsive to power from the fuel cell system at a speed responsive to the speed controller. Coupling the rapid connection interface of the nacelle to the rapid connection interface of the nacelle station provides structural and electrical connections between the airframe and the nacelle that are operable for rapid replacement of the fuel cell powered line-replaceable thrust module at an operating location. The rapid connection interfaces may also include gas connections to facilitate the transmission of hydrogen therethrough. The structural gas tank may be configured for rapid replacement as well, and therefore, may comprise a line-replaceable unit relative the aircraft or a lower line-replaceable unit relative to the line-replaceable thrust module. While the aircraft shown and discussed herein is depicted as a UAV, it should be understood that it may comprise any type of aircraft. Moreover, the structural gas tank disclosed herein may be used on any vehicle.

FIGS. 1-5 illustrate a structural gas tank 100. Tank 100 includes a body 102 defining a chamber configured to store a gas, such as hydrogen, oxygen, carbon dioxide, air, or any other gaseous material, at a pressure greater than atmospheric pressure. Tank 100 may be configured to store gas in the chamber at a pressure greater than approximately 55 bar (798 psi) for solid-state storage, and approximately 300 bar (4,351 psi), 500 bar (7,252 psi), or even 700 bar (10,153 psi) for high pressure gas storage. Body 102 may be made of a metal, such as steel or aluminum, and may optionally include a composite material, such as fiberglass, aramid, or carbon fiber, wrapped around the metal. Alternatively, body 102 may be made of a composite material and may include a metal or polymer liner on the inside.

Tank 100 includes a first mounting element 104 extending from a first portion of body 102 and a second mounting element 106 extending from a second portion of body 102. First mounting element 104 is configured to be coupled to a first component of a vehicle and second mounting element 106 is configured to be coupled to a second component of the vehicle. And body 102 is configured to carry a structural load between the first and second components of the vehicle. First and second mounting elements 104 and 106 may include features to facilitate coupling of first mounting element 104 to the first component and second mounting element 106 to the second component. In the example shown, first and second mounting elements 104 and 106 include openings 108 and 110, respectively, for the insertion of fasteners therethrough. Alternatively, first and second mounting elements 104 and 106 may include any structure for facilitating coupling with coordinating structures on the first and second components of the vehicle. For example, first and second mounting elements 104 and 106 may include internal or external threads, internal or external teeth, smooth surfaces for application of adhesives, male or female portions of ball-detent mechanisms, etc. First and second mounting elements 104 and 106 may be unitary with body 102. That is, they may be formed as part of the same structure as body 102. Alternatively, first and second mounting elements 104 and 106 may be coupled to body 102. In addition, first and second mounting elements 104 and 106 may be unitary with body 102 and include additional structure coupled thereto. For example, first and second mounting elements 104 and 106 may comprise an annular rim that is formed as part of body 102 and further include a threaded metal band coupled thereto to facilitate coupling to the first and second components of the vehicle.

Figure 4:
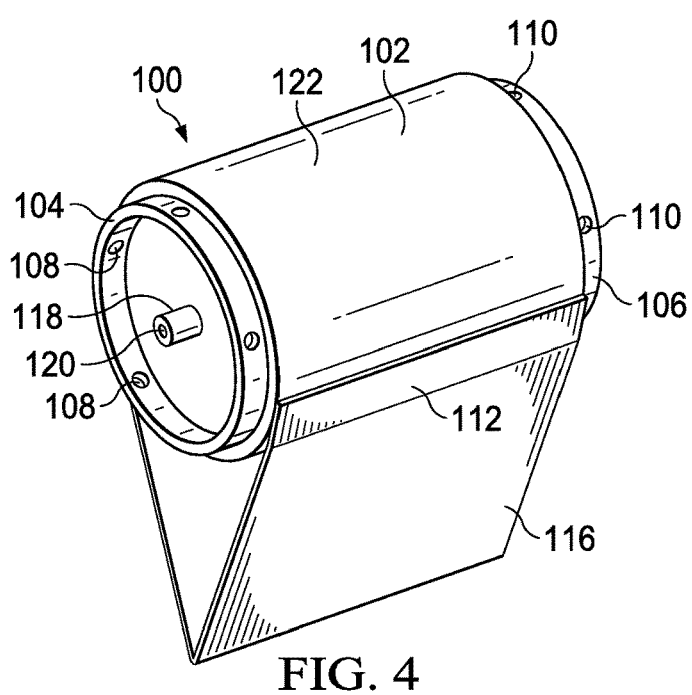
FIG. 4 is an oblique view of the structural gas tank of FIG. 2 including a fairing coupled to thereto.
Figure 5:
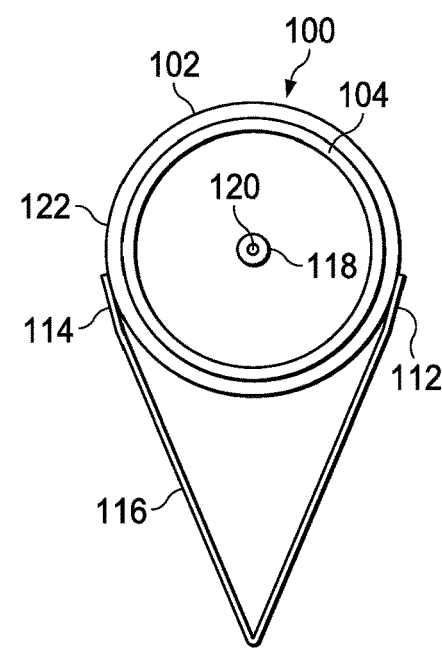
FIG. 5 is a front view of the structural gas tank of FIG. 5.
Figure 6:
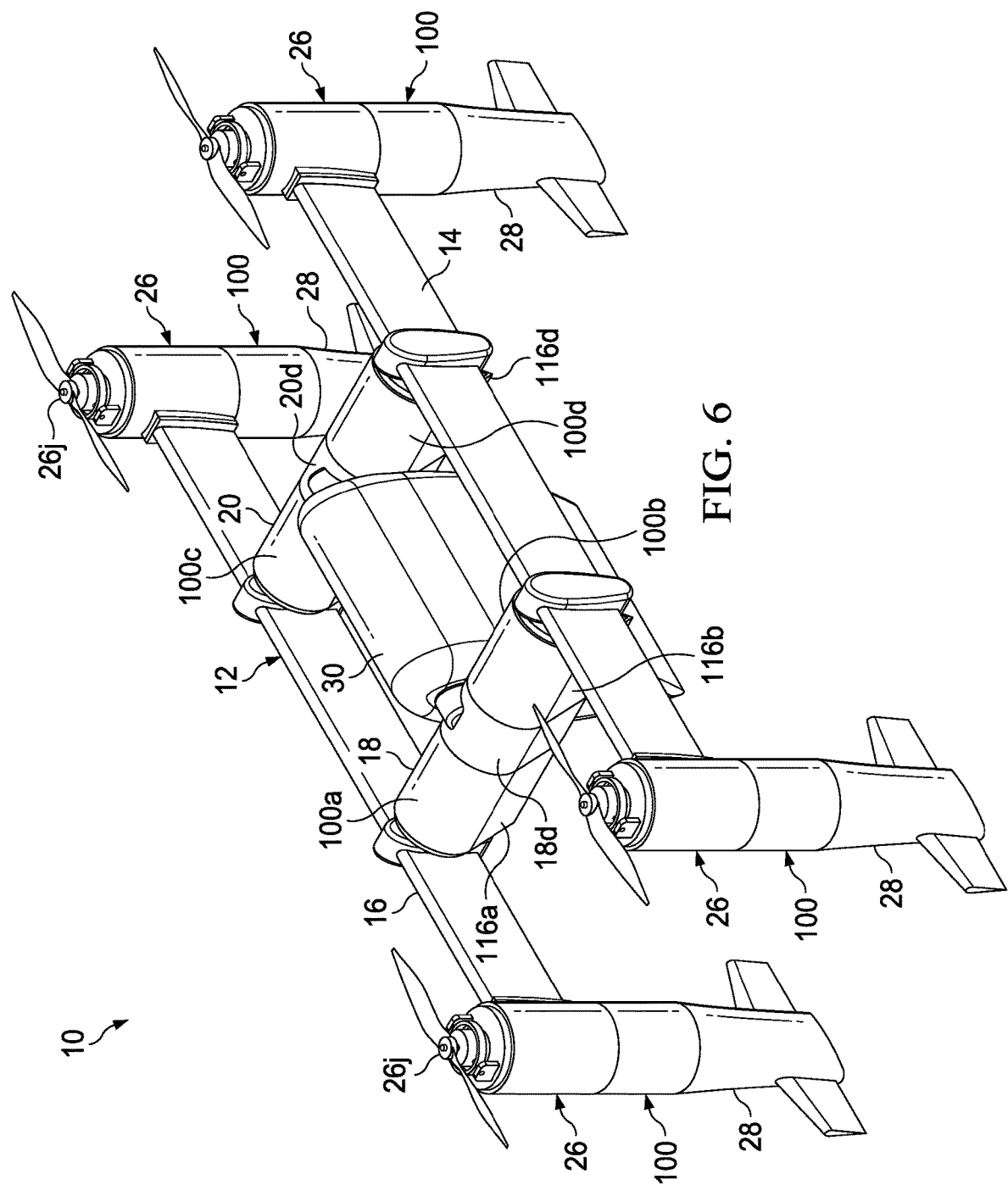
FIG. 6 is an oblique view of a UAV, including four fuel cell powered line-replaceable thrust modules, each including a structural hydrogen tank, according to this disclosure.
Figure 7:
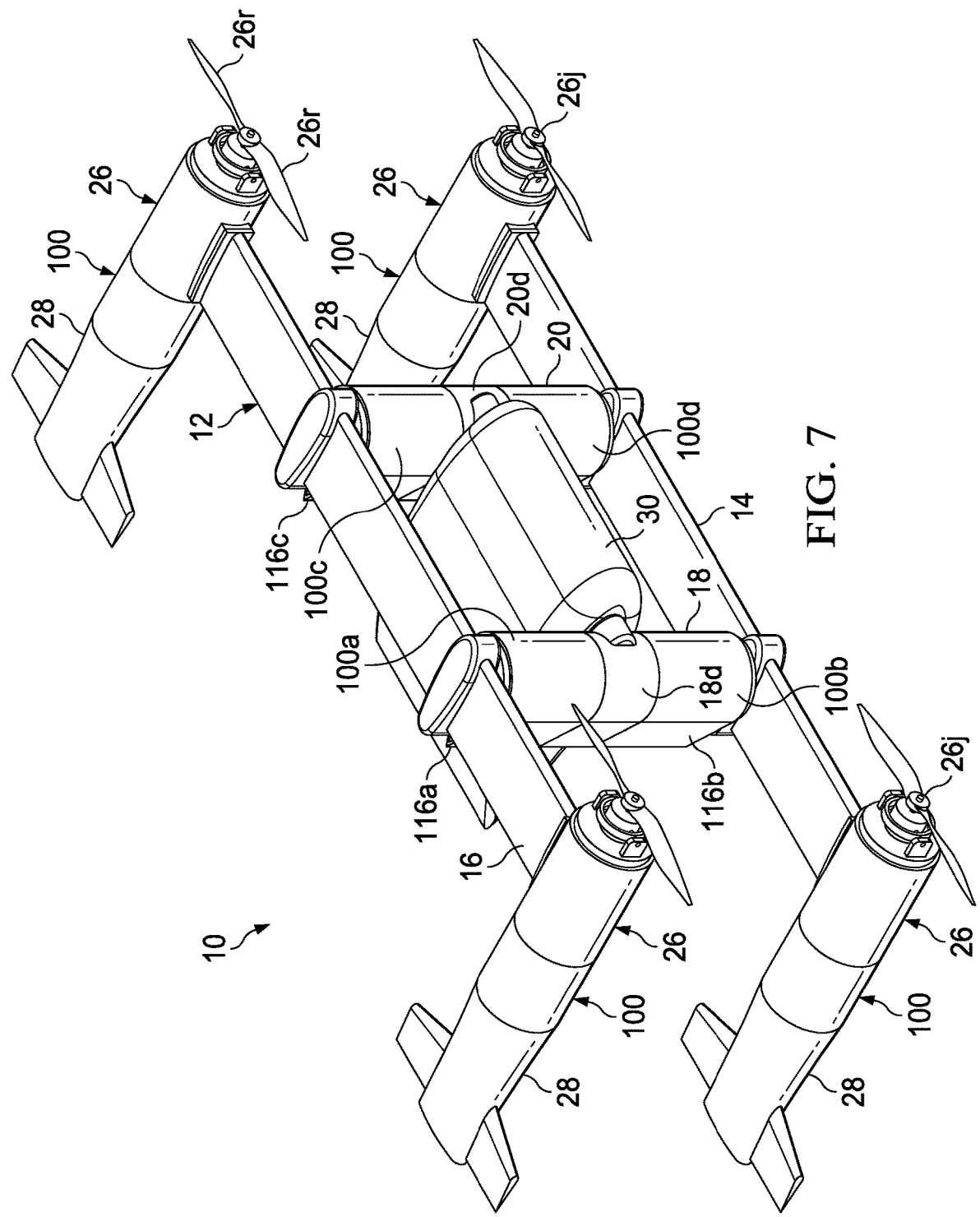
FIG. 7 is another oblique view of the UAV of FIG. 6.

As shown in FIGS. 2-5, tank 100 may also include a third mounting element 112 and a fourth mounting element 114. Similar to first and second mounting elements 104 and 106, third and fourth mounting elements 112 and 114 may be unitary with, or coupled to, body 102. Moreover, third and fourth mounting elements 112 and 114 may also include structure to facilitate coupling of a component thereto. As shown in FIGS. 4 and 5, in order to minimize drag when tank 100 is mounted to a vehicle in a transverse orientation, a fairing 116 is coupled to third and fourth mounting elements 112 and 114. Alternatively, fairing 116 may be coupled directly to body 102 or be unitary therewith.

Tank 100 also includes a stem 118 with an orifice 120 in communication with the chamber to allow filling and/or withdrawing the gas from the chamber. Stem 118 may comprise any suitable structure for such a purpose. For example, stem 118 may comprise a connector including an internal valve, such as quick connect fitting. Stem 118 may include any type of structure to facilitate coupling of a hose, valve, or pressure regulator thereto. For example, stem 118 may include threads that match the pitch of threads on first mounting element 104 such that coupling first mounting element 104 to the first component simultaneously couples stem 118 to an apparatus within the first component. Moreover, stem 118 may comprise a boss configured for receipt of an in-tank pressure regulator or any other suitable device for controlling the filling and withdrawing the gas from the chamber. In addition to stem 118, tank 100 may include a second stem with a second orifice in communication with the chamber to allow filling and/or withdrawing the gas from the chamber. The second stem is preferably located at the opposite end of body 102 from stem 118. The second stem may comprise the same or a different structure than stem 118.

In order to minimize drag of the vehicle, body 102 also includes an outer surface 122 configured to create flush junctions with exterior surfaces of the first and second components when first and second mounting elements 104 and 106 are coupled thereto. While outer surface 122 is shown as a cylinder, it should be understood that outer surface 122 may have any suitable shape, including, for example, frustoconical.

Referring to FIGS. 6-8G, various views of a tail sitter UAV 10, operable to transition between thrust-borne lift in a VTOL orientation and wing-borne lift in a biplane orientation, are depicted. FIGS. 6, 8A, 8C, and 8E depict UAV 10 in the VTOL orientation, wherein the thrust modules provide thrust-borne lift. FIGS. 7, 8B, 8D, and 8F depict UAV 10 in the biplane orientation, wherein the thrust modules provide forward thrust and the forward airspeed of UAV 10 provides wing-borne lift, enabling UAV 10 to have a high speed and/or high endurance forward-flight mode.

UAV 10 is a mission-configurable aircraft operable to provide high-efficiency transportation for diverse payloads. Based upon mission parameters, including flight parameters such as environmental conditions, speed, range, and thrust requirements, as well as payload parameters such as size, shape, weight, type, durability, and the like, UAV 10 may selectively incorporate a variety of thrust modules having different characteristics and/or capacities. For example, the thrust modules operable for use with UAV 10 may have different thrust types including different maximum thrust outputs and/or different thrust vectoring capabilities including non-thrust vectoring thrust modules, single-axis thrust vectoring thrust modules such as longitudinal thrust vectoring thrust modules and/or lateral thrust vectoring thrust modules, and two-axis thrust vectoring thrust modules which may also be referred to as omnidirectional thrust vectoring thrust modules. In addition, various components of each thrust module may be selectable including the power plant configuration and the rotor design. For example, the type or capacity of the fuel cell system in a thrust module may be selected based upon the power, weight, endurance, altitude, and/or temperature requirements of a mission. Likewise, the characteristics of the rotor assemblies may be selected, such as the number of rotor blades, the blade pitch, the blade twist, the rotor diameter, the chord distribution, the blade material, and the like. Different size tanks 100 may be selected based on the fuel requirements for a particular mission.

Figure 8A:
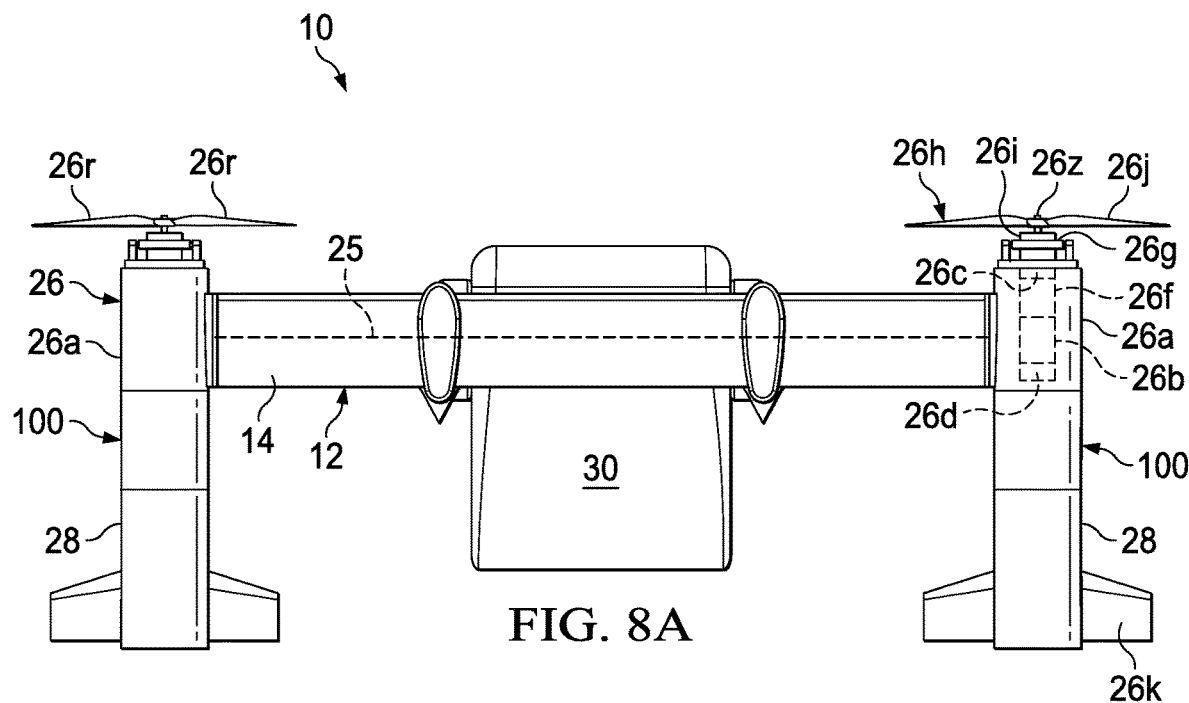
FIGS. 8A-8G are various views of the UAV of FIG. 6.
Figure 8B:
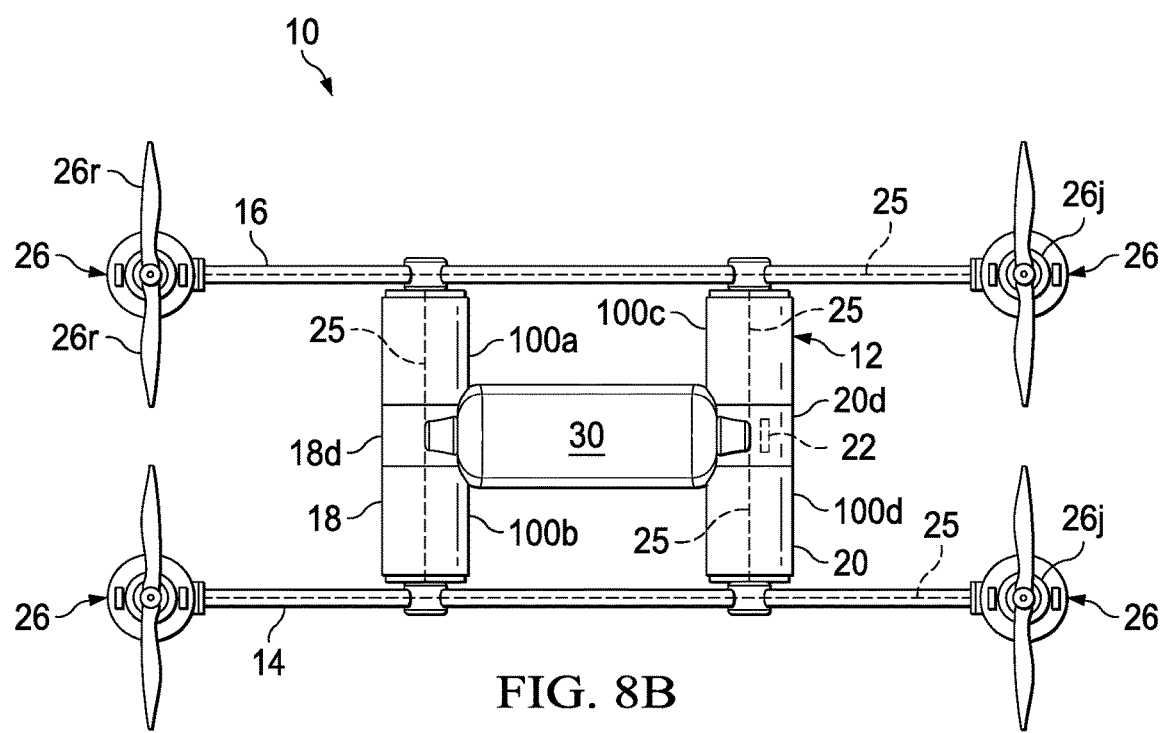
Figure 8C:
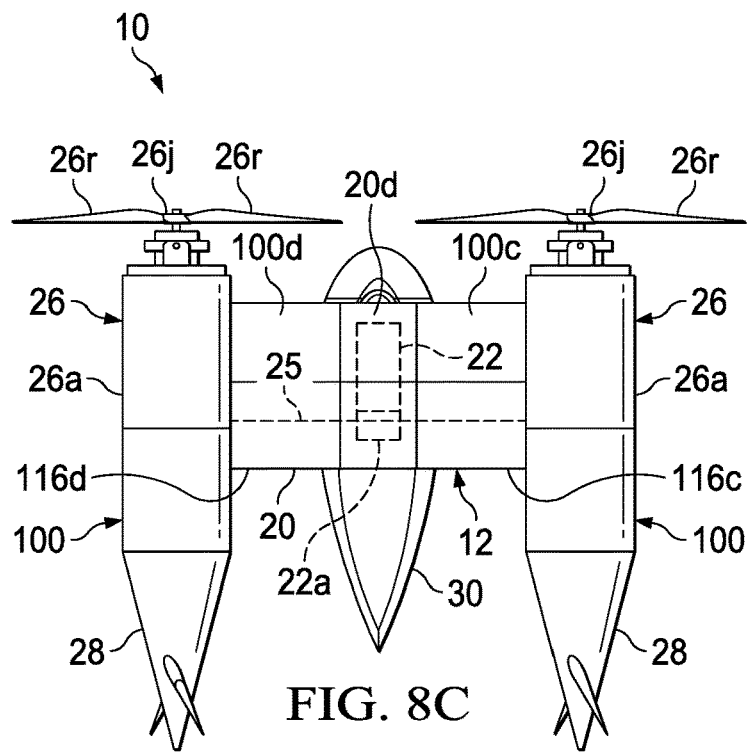
Figure 8D:
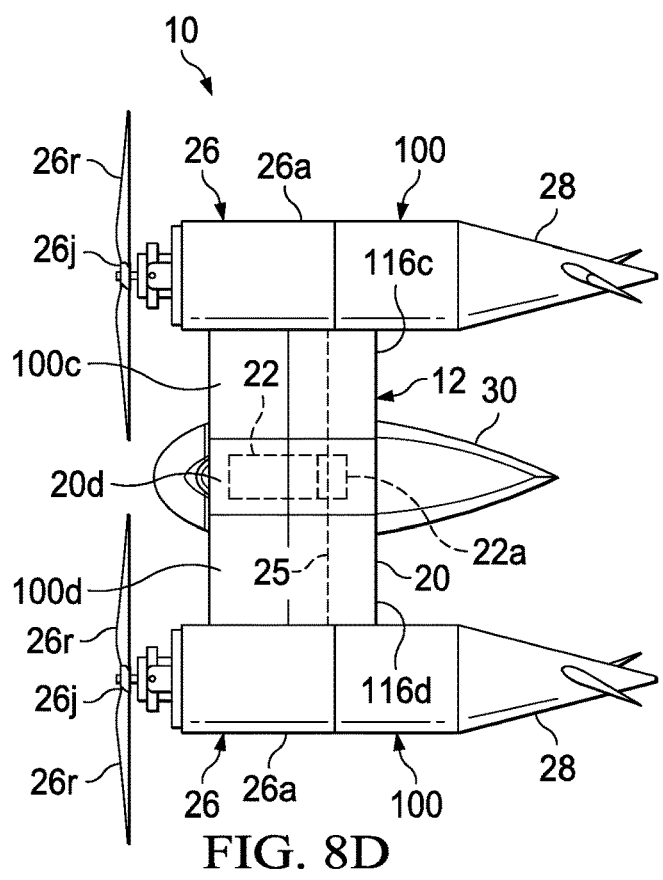
Figure 8E:
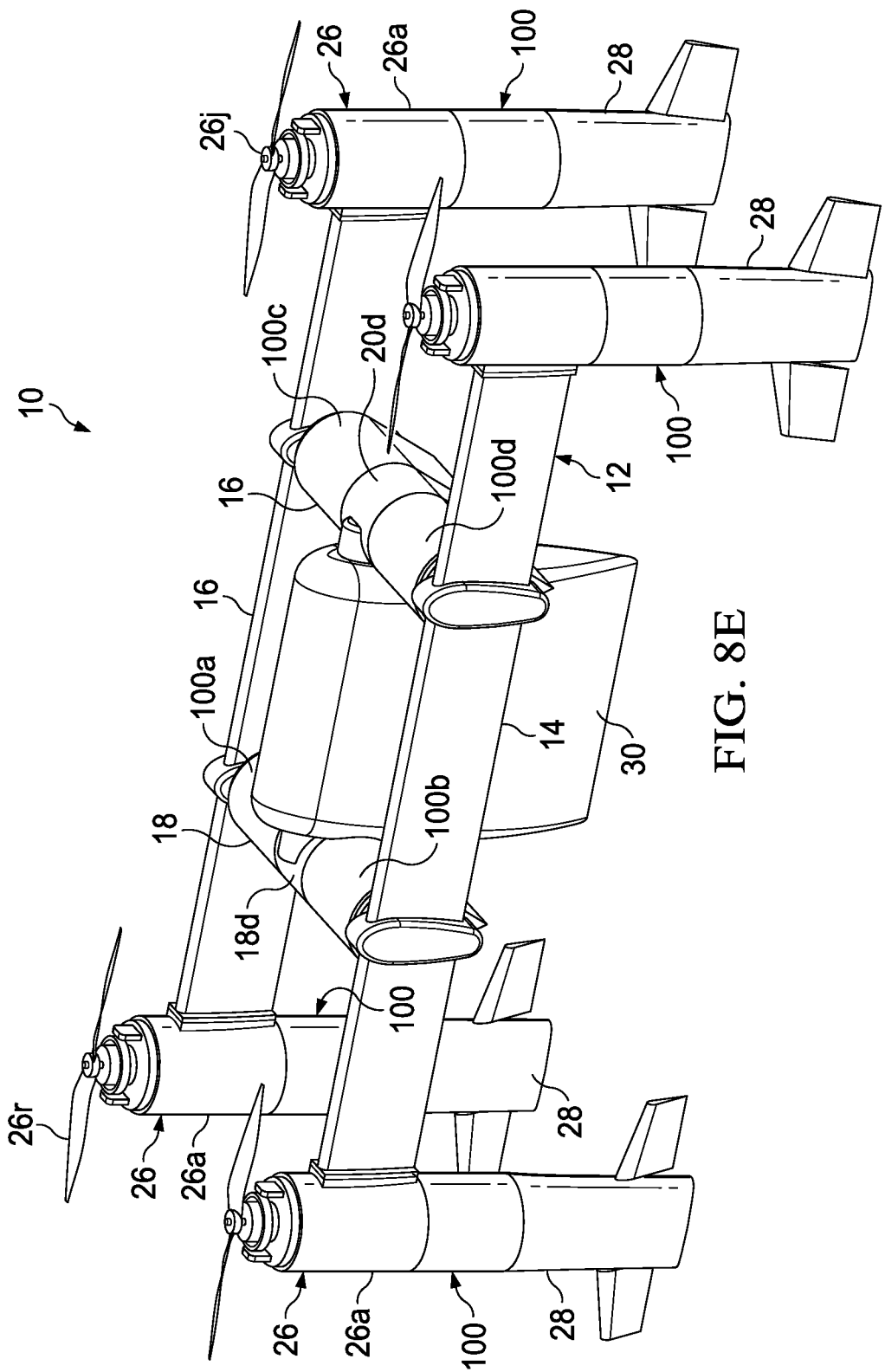
Figure 8F:
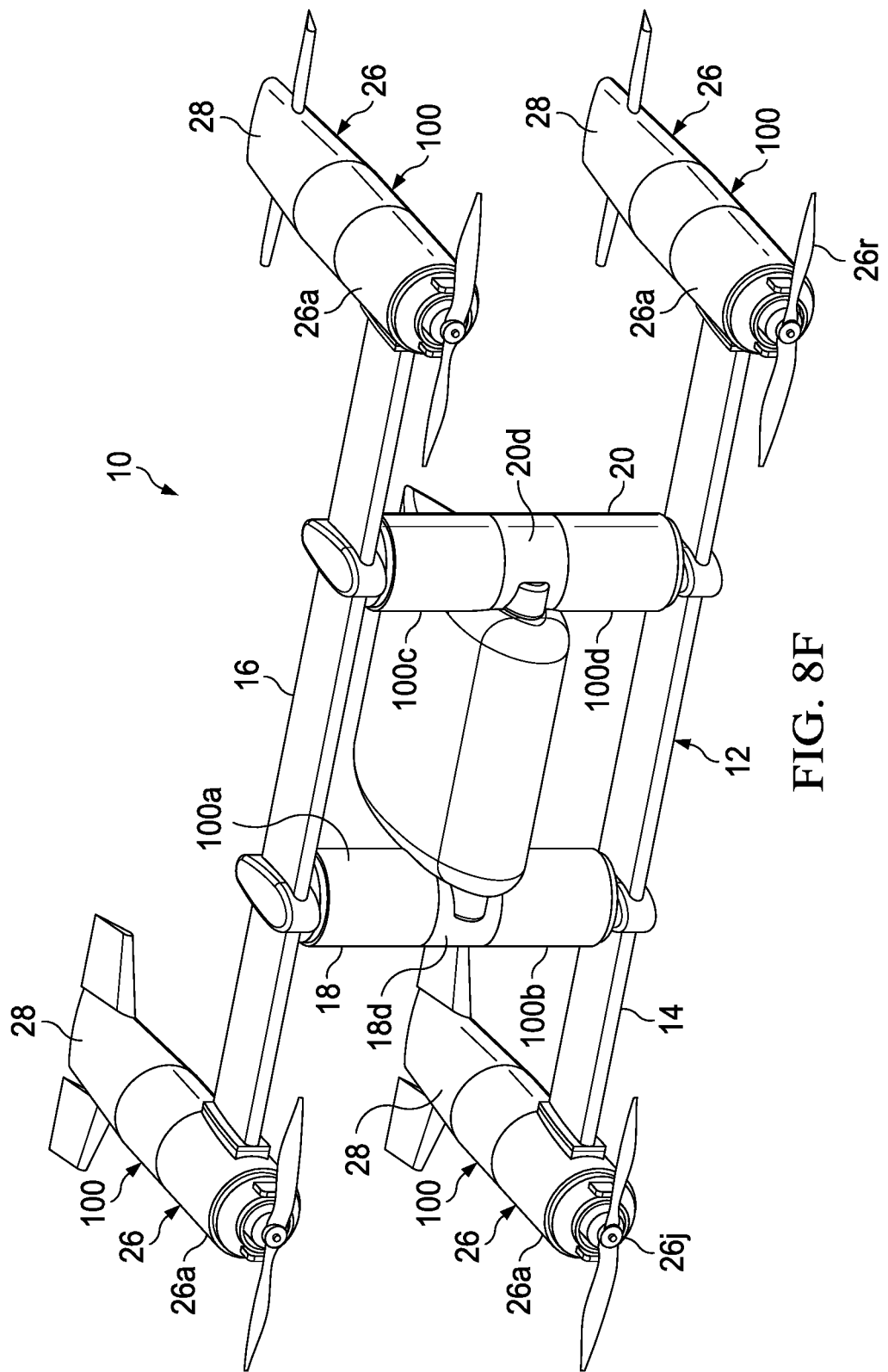
Figure 8G:
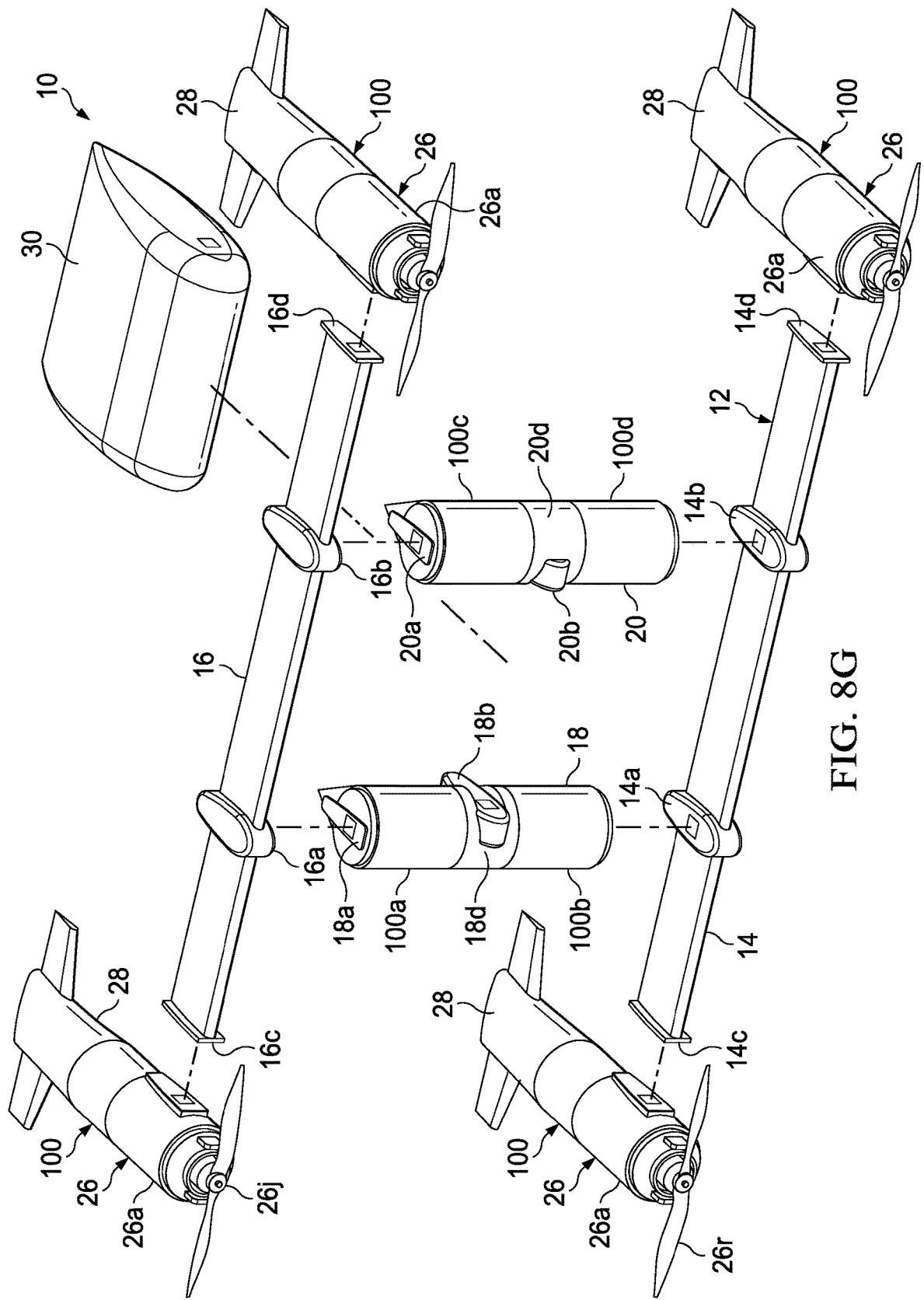

In the illustrated embodiment, UAV 10 includes an airframe 12 including wings 14 and 16 each having an airfoil cross-section that generates lift responsive to the forward airspeed of UAV 10 when in the biplane orientation. Wings 14 and 16 may be formed as single members or may be formed from multiple wing sections. The outer skins of wings 14 and 16 are preferably formed from high strength and lightweight materials such as fiberglass, carbon fiber, plastic, aluminum, and/or another suitable material or combination of materials. As illustrated, wings 14 and 16 are straight wings. In other embodiments, wings 14 and 16 could have other designs such as polyhedral wing designs, swept wing designs, or another suitable wing design. As best seen in FIG. 8G, wing 14 has two anchoring locations, referred to as pylon stations 14a and 14b and two nacelle stations 14c and 14d. Likewise, wing 16 has two pylon stations 16a and 16b and two nacelle stations 16c and 16d. These stations are anchoring locations which serve to provide the structure required for connecting other components of the aircraft thereto. As such, each of pylon stations 14a, 14b, 16a, and 16b and each of nacelle stations 14c, 14d, 16c, and 16d includes a rapid connection interface operable for mechanical, electrical, and/or gaseous connectivity, as discussed herein.

Extending generally perpendicularly between wings 14 and 16 are two truss structures depicted as pylons 18 and 20. Pylon 18 is coupled between pylon stations 14a and 16a and preferably forms mechanical, electrical, and gaseous connections therebetween. Pylon 20 is coupled between pylon stations 14b and 16b and preferably forms mechanical, electrical, and gaseous connection therebetween. In other embodiments, more than two pylons may be present. Pylon 18 comprises a first structural gas tank 100a coupled between pylon station 16a and a center connector 18d and a second structural gas tank 100b coupled between pylon center connector 18d and pylon station 14a. Accordingly, first tank 100a carries structural loads between wing 16 and center connector 18d and second tank 100b carries structural loads between wing 14 and center connector 18d. First and second tanks 100a and 100b are similar to structural gas tank 100 as shown in FIGS. 4 and 5. As such, first and second tanks 100a and 100b include aerodynamic fairings 116a and 116b extending therefrom. In addition, an outer surface of each of first and second tanks 100a and 100b create flush junctions with an exterior surface of center connector 18d. Pylon 20 comprises a first structural gas tank 100c coupled between pylon station 16b and a center connector 20d and a second structural gas tank 100d coupled between pylon center connector 20d and pylon station 14b. Accordingly, first tank 100c carries structural loads between wing 16 and center connector 20d and second tank 100d carries structural loads between wing 14 and center connector 20d. First and second tanks 100c and 100d are similar to structural gas tank 100 as shown in FIGS. 4 and 5. As such, first and second tanks 100c and 100d include aerodynamic fairings 116c and 116d extending therefrom. In addition, an outer surface of each of first and second tanks 100c and 100d create flush junctions with an exterior surface of center connector 20d. Center connectors 18d and 20d are preferably formed from high strength and lightweight materials such as fiberglass, carbon fiber, plastic, aluminum, or another suitable material or combination of materials. As best seen in FIG. 8G, pylon 18 has a nacelle station 18a coupled to tank 100a and a payload station 18b coupled to center connector 18d. Likewise, pylon 20 has a nacelle station 20a coupled to tank 100c and a payload station 20b coupled to center connector 20d. Each of nacelle stations 18a and 20a and each of payload stations 18b and 20b includes a rapid connection interface operable for mechanical, electrical, and gaseous connectivity, as discussed herein.

Wings 14 and 16 and pylons 18 and 20 preferably include passageways operable to contain flight control systems, energy sources, communication lines and/or other desired systems. For example, as best seen in FIGS. 8C and 8D, central connector 20d of pylon 20 houses a flight control system 22 of UAV 10. Flight control system 22 is preferably a redundant digital flight control system including multiple independent flight control computers. For example, the use of a triply redundant flight control system 22 improves the overall safety and reliability of UAV 10 in the event of a failure in flight control system 22. Flight control system 22 preferably includes non-transitory computer readable storage media including a set of computer instructions executable by one or more processors for controlling the operation of UAV 10. In addition, flight control system 22 may be selectively connectable to other computer systems via a proprietary encrypted network, a public encrypted network, the Internet, or other suitable communication network that may include both wired and wireless connections.

Wings 14 and 16 and pylons 18 and 20 may optionally contain one or more of electrical power sources depicted as one or more batteries 22a in central connector 20d, as best seen in FIGS. 8C and 8D. Batteries 22a supply electrical power to flight control system 22. In some embodiments, batteries 22a may be configured to supply emergency backup electrical power for the distributed thrust array of UAV 10. Wings 14 and 16 and pylons 18 and 20 also contain a communication network 25 including the electrical interfaces of pylon stations 14a, 14b, 16a, and 16b, nacelle stations 14c, 14d, 16c, and 16d, and payload stations 18b and 20b that enables flight control system 22 to communicate with the distributed thrust array of UAV 10. In addition to providing for data transmission, communication network 25 also may also enable electrical energy transmission therethrough. In the illustrated embodiment, UAV 10 has a two-dimensional distributed thrust array that is coupled to airframe 12. As used herein, the term "two-dimensional thrust array" refers to a plurality of thrust generating elements that occupy a two-dimensional space in the form of a plane.

The two-dimensional distributed thrust array of UAV 10, as shown in FIGS. 8A-8G, includes a plurality of thrust modules, individually and collectively denoted as 26. Thrust modules 26 are respectively coupled to nacelle stations 14c and 14d of wing 14 and nacelle stations 16c and 16d of wing 16 and preferably form mechanical, electrical, and gaseous connections therewith. In the illustrated embodiment, thrust modules 26 are fixed pitch, variable speed, omnidirectional thrust vectoring thrust modules.

As illustrated, thrust modules 26 are coupled to the outboard ends of wings 14 and 16. While not shown, additional thrust modules 26 may be coupled to central portions of wings 14 and 16. Thrust modules 26 are independently attachable to and detachable from airframe 12 such that UAV 10 may be part of a man-portable aircraft system having component parts with connection features designed to enable rapid assembly/disassembly of UAV 10. Alternatively, or additional, the various components of UAV 10 including flight control system 22, wings 14 and 16, pylons 18 and 20, and thrust modules 26 may be selected by an aircraft configuration computing system based upon mission specific parameters. This may be enabled, in part, by using thrust modules 26 that are standardized and/or interchangeable line replaceable units providing easy installation and removal from airframe 12. As discussed herein, thrust modules 26 may be coupled to nacelle stations 14c, 14d, 16c, and 16d of wings 14 and 16 using rapid connection interfaces to form structural, electrical, and gaseous connections.

For example, the structural connections may include high speed fastening elements such as: cam and hook connections, screws, bolts, pin connections, quarter turn latch connections, snap connections, magnetic connections, and/or electromagnetic connections which may also be remotely releasable connections. The electrical connections may include forming communication channels by connecting the electronics of thrust modules 26 to the communications network 25. The communications channels may include redundant communication channels, triply redundant communication channels, one or more command signal channels, one or more low power current channels, one or more high power current channels, and/or combinations thereof. The gaseous connections may include forming a gaseous plumbing network which permits distribution of gas between any tanks 100-100d and/or to any fuel cell 26d of UAV 10. In addition, the use of line-replaceable thrust modules 26 is beneficial in maintenance situations if a fault is discovered with one of the thrust modules 26. In this case, a faulty thrust module 26 can be decoupled from airframe 12 by simple operations and another thrust module 26 can then be attached to airframe 12.

As best seen in FIGS. 8A and 9-11, each thrust module 26 includes a nacelle 26a that houses components including a fuel cell system 26b, an electronic speed controller 26c, gimbal actuators 26n and 26p (only shown in FIG. 11), an electronics node 26f, sensors, and other desired electronic equipment. Nacelle 26a also supports a two-axis gimbal 26g and a propulsion system 26h depicted as an electric motor 26i and a rotor assembly 26j (not shown in FIGS. 9-11). As the power for each thrust module 26 is provided by fuel cell system 26b, housed within respective nacelles 26a, UAV 10 has a distributed power system for the distributed thrust array. Alternatively, or additionally, electrical power may be supplied to any electric motor 26i, electronic speed controller 26c, electronics node 26f, gimbal actuators 26n or 26p, flight control system 22, sensor, and/or other desired equipment from any fuel cell system 26b via communication network 25.

Each thrust module 26 includes a structural gas tank 100, as described above, configured to store pressurized hydrogen gas therein. Tank 100 is coupled to nacelle 26a via first mounting element 104. A tail section 28 including aerosurfaces 26k is coupled to tank 100 via second mounting element 106. Accordingly, tank 100 carries structural loads between nacelle 26a and tail section 28. Moreover, in order maximize aerodynamic efficiency, outer surface 122 of tank 100 creates flush junctions with exterior surfaces of nacelle 26a and tail section 28.

Figure 9:
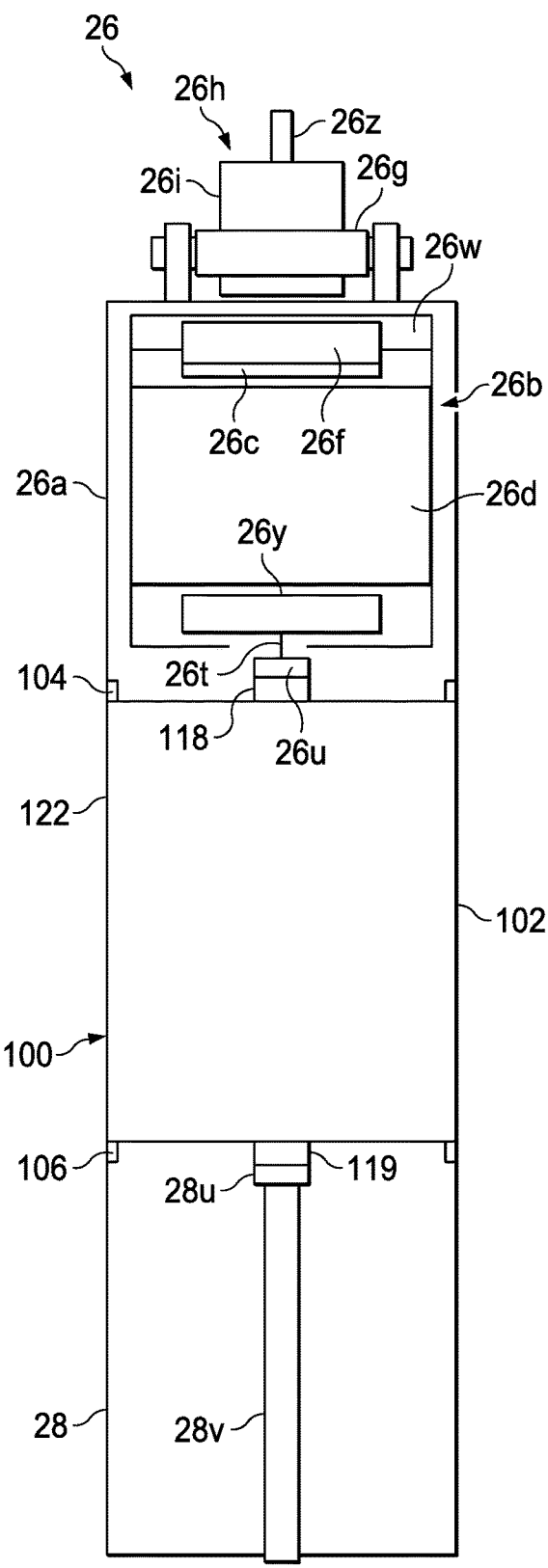
FIG. 9 is a top view of a fuel cell powered line-replaceable thrust module of the UAV of FIG. 6, showing internal components thereof.
Figure 10:
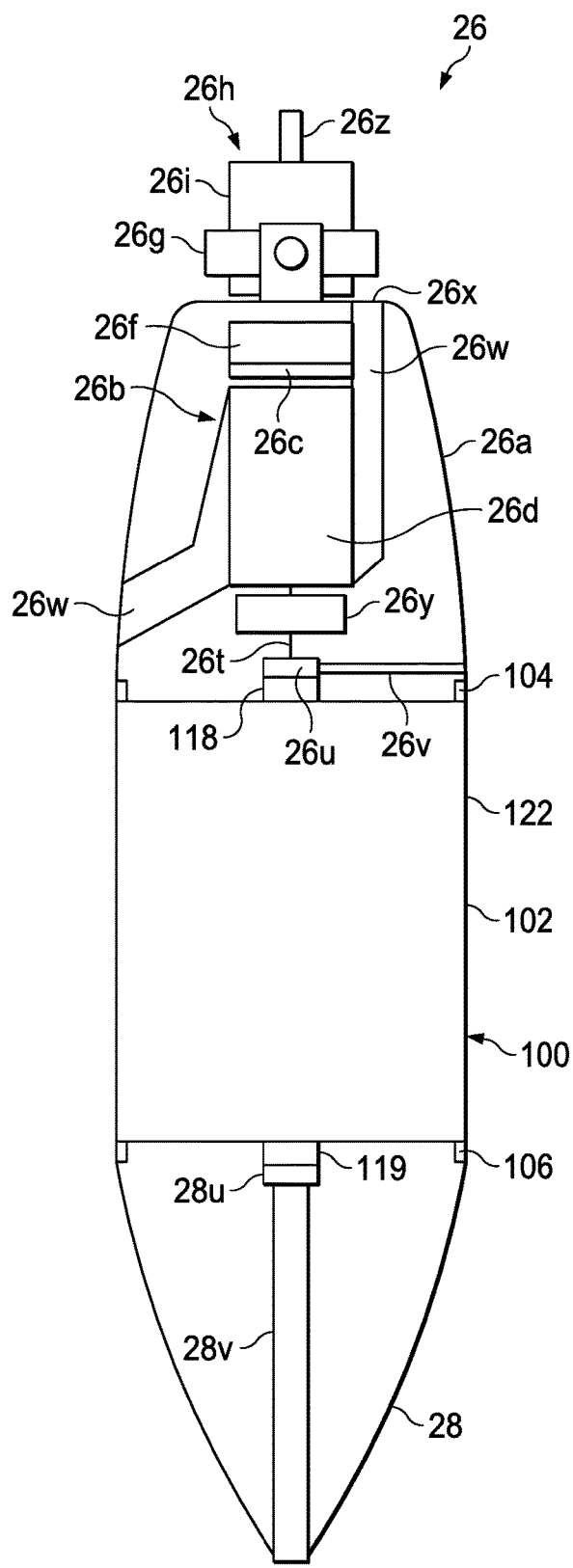
FIG. 10 is a side view of the fuel cell powered line-replaceable thrust module of FIG. 9, showing the internal components thereof.

FIGS. 9 and 10 shows the internal components of thrust module 26. Fuel cell system 26b is configured to produce electrical energy from an electrochemical reaction between hydrogen and oxygen. Fuel cell system 26b includes a fuel cell 26d which includes a cathode configured to receive oxygen from the ambient air, an anode configured to receive hydrogen fuel, and an electrolyte between the anode and the cathode that allows positively charged ions to move between the anode and the cathode. While fuel cell 26d is described in the singular, it should be understood that fuel cell 26d may include a fuel cell stack comprising a plurality of fuel cells in series to increase the output thereof. Fuel cell system 26b receives hydrogen fuel from structural gas tank 100. Hydrogen fuel is delivered from structural tank 100 to the anode of fuel cell 26d through a supply line 26t coupled to a pressure regulator 26u, which is coupled to stem 118 of tank 100. Pressure regulator 26u is configured to reduce the pressure of the hydrogen fuel from tank 100 to a desired pressure in supply line 26t that is suitable for use at the anode of fuel cell 26d. Pressure regulator 26u may also have a filling port 26v coupled thereto. Filling port 26v is configured to enable refilling of tank 100 without uncoupling tank 100 from nacelle 26a. Filling port 26v may allow for autonomous refilling of tank 100 when UAV 10 lands on a landing pad configured for the same. Alternatively, or additionally, thrust module 26 may include a pressure regulator 28u coupled to a stem 119 of tank 100, and a filling port 28v coupled to pressure regulator 28u. Filling port 28v extends from pressure regulator 28u to the exterior surface of tail section 28, thereby enabling refilling of tank 100 without uncoupling tank 100 from tail section 28.

Oxygen from the ambient air is delivered to the cathode of fuel cell 26d via an air channel 26w. Air channel 26w may serve two functions, supplying oxygen to the cathode and cooling fuel cell 26d. As such, air channel 26w is configured to direct air from outside of nacelle 26a to the cathode of fuel cell 26d and/or to a heat transfer surface of fuel cell 26d. The heat transfer surface of fuel cell 26d may comprise a heat exchanger or any surface configured to enhance heat removal therefrom. Moreover, if fuel cell 26d is an open-cathode air-cooled unit, the airflow delivered to the cathode by air channel 26w may serve as both the cathode reactant supply and cooling air. That is, air ducted to a single location may deliver oxygen to the cathode and cool fuel cell 26d. Air channel 26w includes a forward-facing opening 26x positioned behind rotor assembly 26j such that air is driven through air channel 26w by rotating rotor blades 26r. This is particularly helpful when UAV 10 is operating in the VTOL orientation, as it insures sufficient airflow for oxygen supply and/or cooling purposes. Fuel cell system 26b further includes an electrical energy storage device 26y configured to store and release the electrical energy produced by fuel cell 26d. Electrical energy storage device may comprise a battery, a supercapacitor, or any other device capable of storing and releasing electrical energy. Alternatively, the electrical energy produced by fuel cell 26d may be directly supplied to the electrical components.

Operation of fuel cell system 26b is controlled by electronics node 26f. Electronics node 26f preferably includes non-transitory computer readable storage media including a set of computer instructions executable by one or more processors for controlling the operation of line-replaceable thrust module 26. These operations may include valve and solenoid operations to adjust the flow of hydrogen fuel from supply line 26t to the anode, battery management, directing electrical energy distribution, voltage monitoring of fuel cell 26d, current monitoring for fuel cell 26d and electrical energy storage device 26y, etc.

Figure 11:
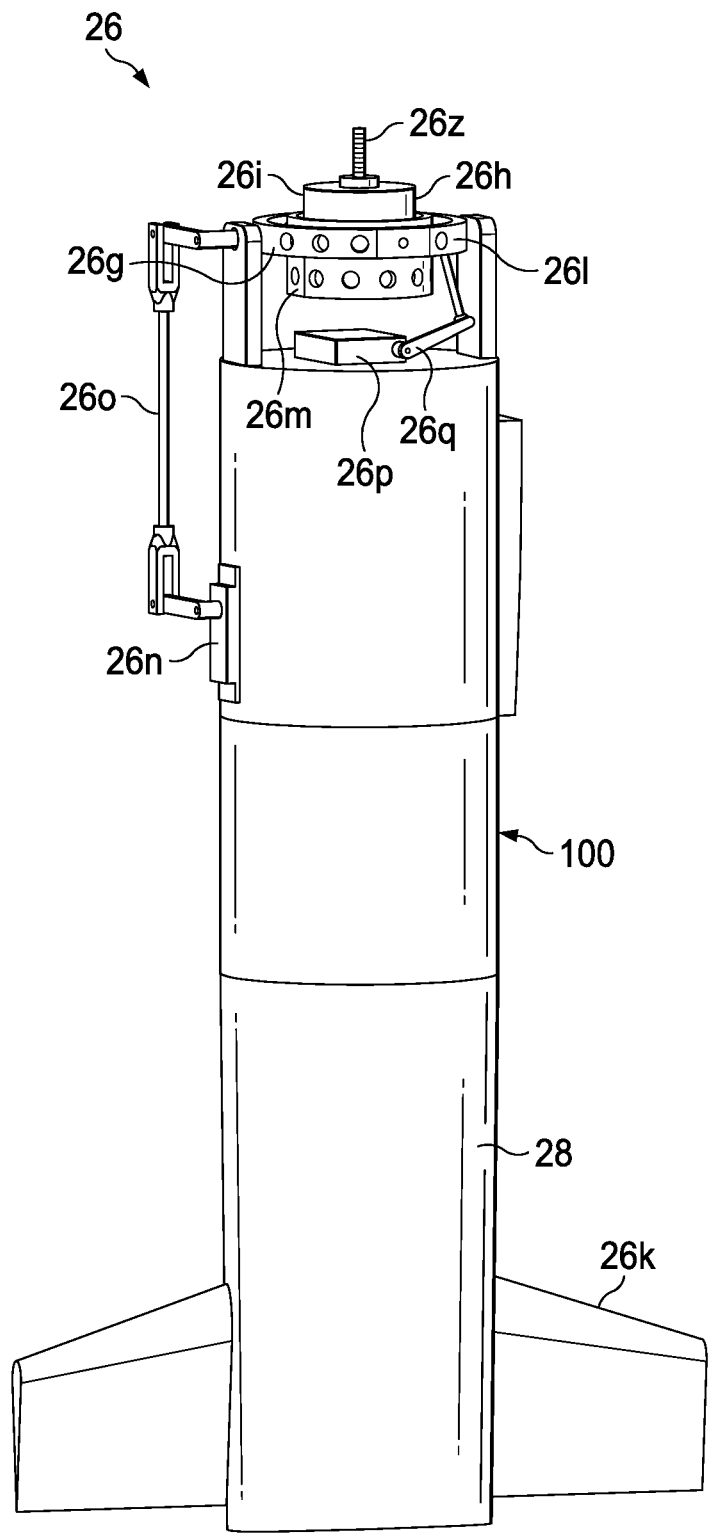
FIG. 11 is an oblique view of the fuel cell powered line-replaceable thrust module of FIG. 6.

FIG. 11 depicts one possible configuration of components for providing omnidirectional thrust vectoring. Thrust module 26 includes nacelle 26a and gimbal 26g that is coupled to nacelle 26a. Gimbal 26g includes an outer gimbal member 26l and an inner gimbal member 26m. Outer gimbal member 26l is pivotally coupled to nacelle 26a and is operable to tilt about a first axis. Inner gimbal member 26m is pivotally coupled to outer gimbal member 26l and is operable to tilt about a second axis that is orthogonal to the first axis. In the illustrated embodiment, actuator 26n is coupled between nacelle 26a and outer gimbal member 26l such that operation of actuator 26n shifts a linkage 26o to tilt outer gimbal member 26l about the first axis relative to nacelle 26a. While actuator 26n and linkage 26o are shown outside nacelle 26a, they could be placed inside nacelle 26a for aerodynamic efficiency. Actuator 26p is coupled between nacelle 26a and inner gimbal member 26m such that operation of actuator 26p shifts a linkage 26q to tilt inner gimbal member 26m about the second axis relative to outer gimbal member 26l and nacelle 26a. Propulsion system 26h is coupled to and is operable to tilt with gimbal 26g about both axes relative to nacelle 26a. In the illustrated embodiment, rotor assembly 26j has been removed from propulsion system 26h such that only electric motor 26i is visible.

Each rotor assembly 26j (shown in FIGS. 6-8G) is coupled to an output driveshaft 26z of the respective electric motor 26i that rotates rotor assemblies 26j in a rotational plane to generate thrust for UAV 10. In the illustrated embodiment, each rotor assembly 26j includes two rotor blades 26r having a fixed pitch. In other embodiments, the rotor assemblies could have other numbers of rotor blades including rotor assemblies having three or more rotor blades. Alternatively, or additionally, the rotor assemblies could have variable pitch rotor blades with collective and/or cyclic pitch control. Each electric motor 26i is paired with one rotor assembly 26j to form one propulsion system 26h. As described herein, each propulsion system 26h has a two-axis tilting degree of freedom relative to nacelle 26a provided by two-axis gimbal 26g such that thrust modules 26 are omnidirectional thrust vectoring thrust modules. In the illustrated embodiment, the maximum angle of the thrust vector may preferably be between about 10 degrees and about 30 degrees, may more preferably be between about 15 degrees and about 25 degrees, and may most preferably be about 20 degrees. Notably, using a 20-degree thrust vector yields a lateral component of thrust that is about 34 percent of total thrust. In other embodiments, the inboard and/or the outboard propulsion systems may have a single-axis tilting degree of freedom in which case, the thrust modules could act as longitudinal and/or lateral thrust vectoring thrust modules.

Given that the tips of rotor blades 26r extend beyond the edges of nacelle 26a, it may be beneficial to store rotor assemblies 26j, or just rotor blades 26r, uncoupled from the line-replaceable thrust modules 26. Moreover, because configurations of rotor assemblies 26j may be dependent on particular mission parameters, it may be desirable to store multiple different configurations of rotor assembly 26j such that they may be readily changed to meet the varying mission parameters. Finally, rotor blades 26r are exposed and may be damaged. However, unlike the more complex components of thrust module 26, rotor blades 26r and/or rotor assembly 26j may be easily removed and replaced at an operating location. Accordingly, rotor blades 26r and/or rotor assembly 26j may be considered lower line-replaceable units and may be stored in larger quantities than thrust modules 26. To facilitate rapid removal and replacement of damaged rotor assembly 26j and/or rotor blades 26r, it may be desirable for the rotor assembly 26j and/or rotor blades 26r to be configured for toolless coupling and uncoupling with thrust module 26.

Flight control system 22 communicates via wired communications network 25 of airframe 12 with electronics node 26f of thrust module 26. Flight control system 22 receives sensor data from and sends flight command information to electronics node 26f such that each thrust module 26 may be individually and independently controlled and operated. For example, flight control system 22 is operable to individually and independently control the speed, and the thrust vector of each thrust module 26. Flight control system 22 may autonomously control some or all aspects of flight operation for UAV 10. Flight control system 22 is also operable to communicate with remote systems, such as a ground station via a wireless communications protocol. The remote system may be operable to receive flight data from and provide commands to flight control system 22 to enable remote flight control over some or all aspects of flight operation for UAV 10.

UAV 10 may operate as a transport aircraft for a payload 30 that is fixed to, or selectively attachable to and detachable from, airframe 12. In the illustrated embodiment, payload 30 is selectively couplable between payload stations 18b and 20b of pylons 18 and 20, preferably forming a mechanical and electrical connection therebetween. Payload 30 may carry, include, or be integral with a variety of modules such as a package delivery module, an air reconnaissance module, a light detection and ranging module, a camera module, an optical targeting module, a laser module, a sensors module, an air-to-ground weapons module, an air-to-air weapons module, a communications module, and/or a cargo hook module or the like depending upon the mission being perform by UAV 10. The connection between payload stations 18b and 20b and payload 30 may be a fixed connection that secures payload 30 in a single location relative to airframe 12. Alternatively, payload 30 may be allowed to rotate and/or translate relative to airframe 12 during ground and/or flight operations.

As forward flight in the biplane orientation utilizing wing-borne lift requires significantly less power than VTOL flight utilizing thrust-borne lift, the operating speed of some or all of thrust modules 26 may be reduced. In certain embodiments, some of the thrust modules 26 of UAV 10 could be shut down during forward flight.

While UAV 10 may be reconfigured with different numbers or types of thrust modules to satisfy different flight requirements, UAV 10 may also be configured to allow fuel cell system 26b to switch between operating on oxygen from ambient air and operating on oxygen provided by an on board oxygen tank such as the system disclosed in U.S. patent application Ser. No. 16/214,735, filed on Dec. 10, 2018, which is incorporated herein by reference in its entirety. Operating a fuel cell on oxygen, rather than air, can increase the power produced by the fuel cell, at sea level, by 15 to 20 percent. As such, the increased power of the oxygen mode may be used in the VTOL orientation and air mode may be used in the biplane orientation. It may be desirable for UAV 10 to have an oxygen tank that is remote from the thrust modules. Accordingly, a remote oxygen tank may be located anywhere on UAV 10, for example, one or more of tanks 100a-100d may be configured to store and distribute pressurized oxygen to thrust modules 26 when needed. In this configuration, UAV 10 includes a supply line coupled between the remote oxygen tank and the cathode of fuel cell 26d. The supply line may be uninterrupted between the remote oxygen tank and the cathode, which would require a user to manually attached the supply line to the cathode when coupling thrust module to UAV 10.

Alternatively, the thrust module and UAV 10 may include complimentary rapid connection interfaces that include not only electrical and mechanical connections, but also include gaseous connections for automated, or quick-connection, of separate portions of the supply line.

Figure 12A:
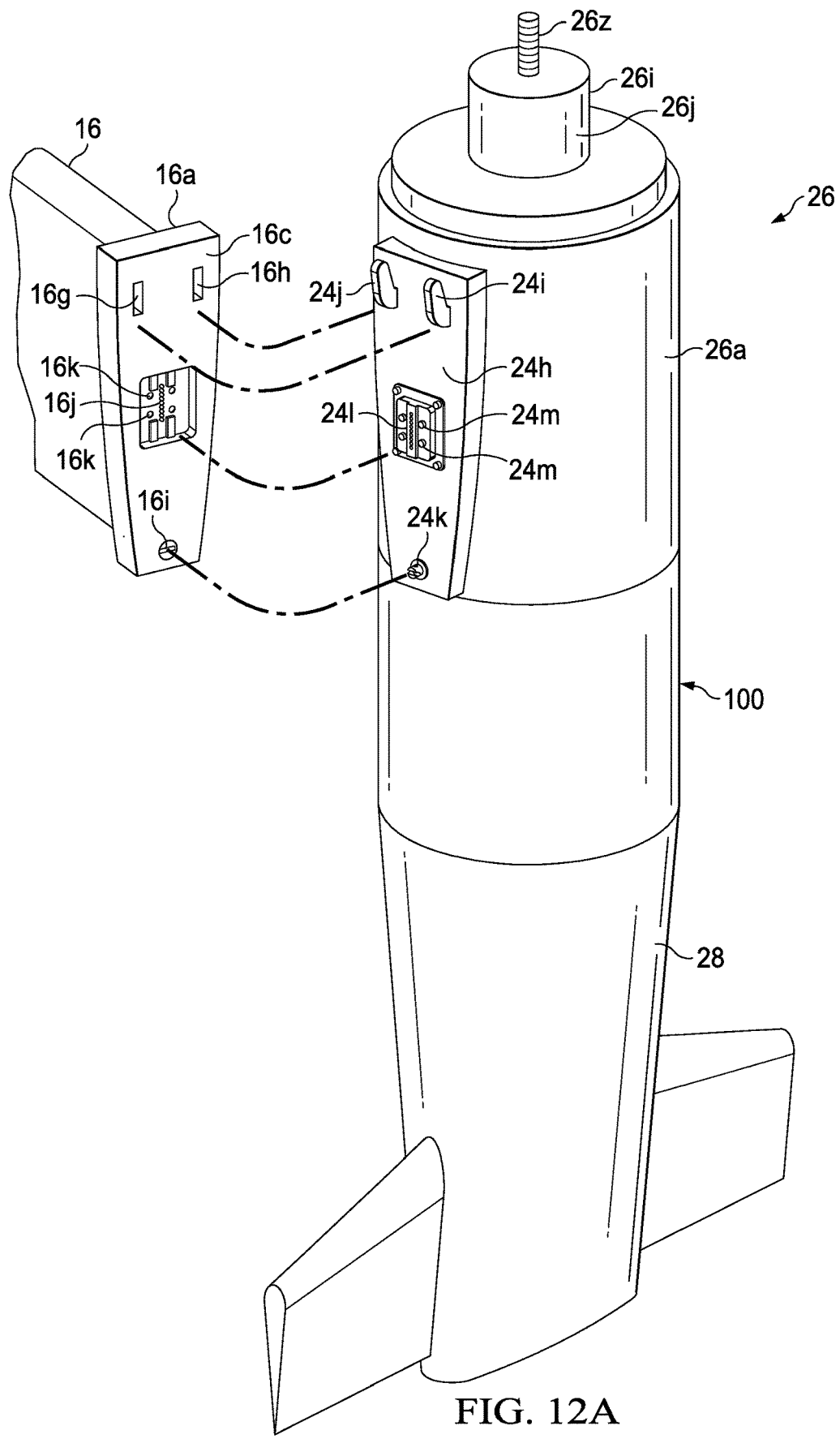
FIGS. 12A-12C are various views of a connecting structure for attaching a fuel cell powered line-replaceable thrust module to a UAV.
Figure 12B:
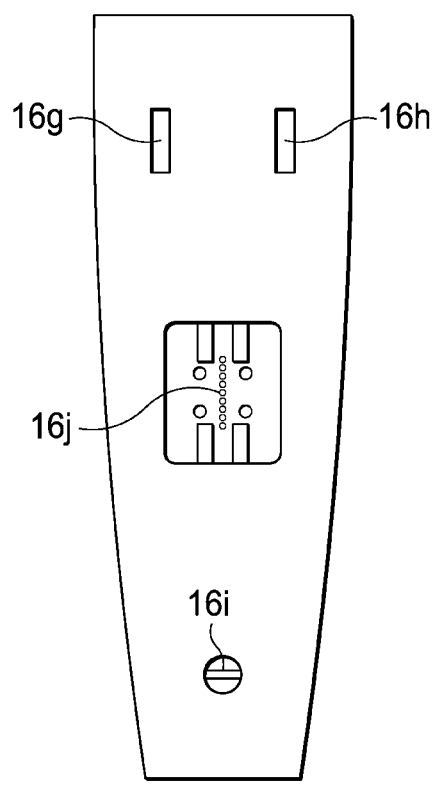
Figure 12C:
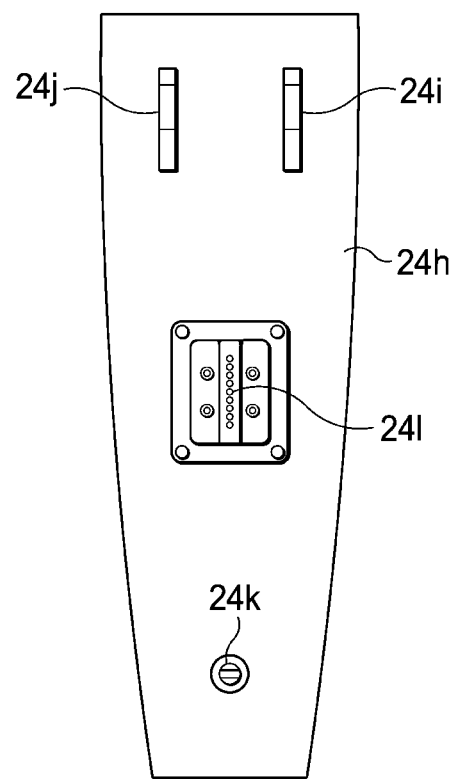

The connections between wings 14 and 16, pylons 18 and 20, thrust modules 26, and payload 30 of UAV 10 are each operable for rapid on-site assembly through the use of high-speed fastening elements. For example, referring to FIGS. 12A-12C, the structural, electrical, and gaseous connections between nacelle station 16c of wing 16 and thrust module 26 will now be described. Nacelle station 16c has a rapid connection interface that includes a pair of upper mechanical connections depicted as cams 16g and 16h, the outer slot portion of each being visible in the drawings. Nacelle station 16c includes a lower mechanical connection depicted as spring 16i. Disposed between cams 16g and 16h and spring 16i is a central mechanical connection including an electrical connection depicted as a female mating profile with a plurality of electrical pins 16j, such as spring biased pins, and a gaseous connection depicted as ports 16k. In the illustrated embodiment, thrust module 26 includes a rapid connection interface 24h having a pair of upper mechanical connections depicted as hooks 24i and 24j and a lower mechanical connection depicted as a slotted fastener 24k. Disposed between hooks 24i and 24j and slotted fastener 24k is a central mechanical connection including an electrical connection depicted as a male mating profile with a plurality of electrical sockets 24l, and a gaseous connection depicted as stubs 24m.

In operation, nacelle station 16c and thrust module 26 may be coupled and decoupled with simple operations. Specifically, to couple thrust module 26 with nacelle station 16c, the distal ends of hooks 24i and 24j are inserted into the outer slots of cams 16g and 16h with thrust module 26 tilted relative to nacelle station 16c at an angle between about 30 degrees and about 60 degrees. Once hooks 24i and 24j are inserted into cams 16g and 16h, thrust module 26 is rotated relative to nacelle station 16c about cams 16g and 16h to reduce the angle therebetween, such that hooks 24i and 24j further penetrate into nacelle station 16c providing a self-location operation for the other mechanical, electrical, and gaseous connections. Specifically, as the angle between thrust module 26 and nacelle station 16c is reduced, the male mating profile enters the female mating profile and pins 16j sequentially enter sockets 24l forming a multi-channel parallel interface, and stubs 24m enter ports 16k forming a gaseous connection therebetween. Depending upon the number of pin and sockets, as well as the desired communication protocol being established therebetween, this electrical connection may provide single communication channels, redundant communication channels, or triply redundant communication channels for the transfer of control commands, low power current, high power current, and/or other signals between thrust module 26 and nacelle station 16c to enable, for example, communication between flight control system 22 and components within thrust module 26 such as fuel cell system 26b, electronic speed controller 26c, electronics node 26d, sensors, and/or other electronic equipment, as discussed herein.

As the angle between thrust module 26 and nacelle station 16c is further reduced, a lower mechanical connection between thrust module 26 and nacelle station 16c is established with slotted fastener 24k and spring 16i. Once spring 16i enters the channel of slotted fastener 24k, a simple manual or automated quarter turn rotation of slotted fastener 24k securely completes the mechanical and electrical connection of thrust module 26 with nacelle station 16c. In a similar manner, the various connections may be made between pylons 18 and 20 and pylon stations 14a, 14b, 16a, and 16b, thrust modules 26 and nacelle stations 14c, 14d, and 16d, payload 30 and payload stations 18b and 20b, in accordance with the desired configuration of UAV 10.

Disassembly of UAV 10 is achieved by reversing the assembly process. Referring again to FIGS. 12A-12C, from the assembled state, a quarter turn rotation of slotted fastener 24k enables separation of slotted fastener 24k from spring 16i. Thereafter, thrust module 26 is rotated relative to nacelle station 16c about cams 16g and 16h to increase the angle therebetween. As the angle between thrust module 26 and nacelle station 16c is increased, the electrical connection between thrust module 26 and nacelle station 16c is released as pins 16j sequentially separate from sockets 24l and the male mating profile separates from the female mating profile, and stubs 24m separate from ports 16k. As the angle between thrust module 26 and nacelle station 16c is further increased, hooks 24i and 24j are released from cams 16g and 16h completing the mechanical, electrical, and gaseous decoupling of thrust module 26 from nacelle station 16c. In a similar manner, the connections between pylons 18 and 20 and pylon stations 14a, 14b, 16a, and 16b, thrust modules 26 and nacelle stations 14c, 14d, and 16d, and payload 30 and payload stations 18b and 20b, may be decoupled.

The structural loads carried by the various tanks 100-100*d* may vary throughout the course of a mission. For example, UAV 10 is a tail sitter aircraft. Accordingly, while UAV 10 is on the ground, the four tanks 100 will carry the weight of UAV 10, less the weight of tail sections 28, in compression. However, while UAV 10 operates in a vertical orientation, i.e., taking off, landing, hovering, and low-speed horizontal flight, the structural load carried by each tank 100 will primarily be the weight of the respective tail section 28 coupled thereto, as well as the additional tensile load caused by the mass of tail section 28 during vertical acceleration. In addition, depending on wind direction and horizontal speed, additional bending loads from wind resistance against tail sections 28 may be carried by tanks 100. While UAV 10 operates in a horizontal orientation, the loads carried by each tank 100 may include: tensile forces due to drag of the corresponding tail section 28, bending forces resulting in tensile and compressive forces on opposite sides of tank 100 caused by aerosurfaces 26*k* stabilizing UAV 10 during forward flight as well as during pitching of UAV 10, and bending and rotational loads may be imparted to tanks 100 during rolling of UAV 10. Whereas tanks 100*a*-100*d* will generally carry a bending load from the weight of payload 30 while on the ground and while operating in the vertical orientation. Tanks 100*a*-100*d* will generally carry a bending load while operating in the horizontal orientation as well, due to the drag imparted by payload 30. However, during maneuvers of UAV 10, tanks 100*a*-100*d* may also carry purely compressive or tensile loads.

At least one embodiment is disclosed, and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k^* (R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A tank, comprising:
   a body defining a chamber therein, the chamber being configured to store a gas at a pressure greater than atmospheric pressure and the body comprising a tubular wall joined between a first transverse wall and a second transverse wall;
   a first mounting element extending axially from the first transverse wall of the body; and
   a second mounting element extending from the second transverse wall of the body;
   wherein the first mounting element and the second mounting element are configured for coupling to a first component of a vehicle and a second component of the vehicle, respectively, and the body is configured to carry a structural load between the first component and the second component when the first mounting element and the second mounting element are coupled thereto;
   wherein the first component carries a propulsion device and wherein the second component comprises at least one of a wing and a landing element;
   wherein the tank further comprises a stem comprising an orifice, the stem being configured for delivering the gas to the propulsion device through the orifice; and
   wherein the first mounting element axially overlaps the stem and wherein the first mounting element comprises radially outer extents less than the radially outer extents of the tubular wall.

2. The tank of claim 1, wherein the chamber is configured to store the gas at a pressure greater than approximately 55 bar (798 psi).

3. The tank of claim 2, wherein the chamber is configured to store the gas at a pressure greater than approximately 300 bar (4351 psi).

4. The tank of claim 1, wherein the body comprises a composite material.

5. The tank of claim 1, wherein the body comprises a metal.

6. The tank of claim 1, wherein the first mounting element is unitary with the body.

7. The tank of claim 1, wherein the first mounting element is coupled to the body.

8. The tank of claim 1, further comprising:
   a fairing extending from the body.

9. A tank, comprising:
   a body defining a chamber therein, the chamber being configured to store a gas at a pressure greater than atmospheric pressure and the body comprising a tubular wall joined between a first transverse wall and a second transverse wall; and
   a first mounting element on a first portion of the body configured to be coupled to a first component of a vehicle, wherein the first mounting element extends axially from the first transverse wall and radially extends less than the tubular wall;
   wherein an outer surface of the body is configured to create a flush junction with an exterior surface of the first component when the first mounting element is coupled to the first component; and
   wherein the first component carries a propulsion device;
   wherein the tank further comprises a stem comprising an orifice, the stem being configured for delivering the gas to the propulsion device through the orifice; and wherein the first mounting element axially overlaps the stem.

10. The tank of claim 9, further comprising:
a first orifice in communication with the chamber; and
a second orifice in communication with the chamber.

11. The tank of claim 9, further comprising:
a fairing extending from the body.

12. The tank of claim 9, further comprising:
a second mounting element on a second portion of the body configured to be coupled to a second component of the vehicle.

13. The tank of claim 9, further comprising:
a third mounting element; and
a fourth mounting element,
wherein the third mounting element and the fourth mounting element are configured for coupling a fairing thereto.

14. The tank of claim 9, wherein the chamber is configured to store the gas at a pressure greater than approximately 55 bar (798 psi).

15. The tank of claim 9, wherein the body and the first mounting element comprise a composite material.

\* \* \* \* \*